Nov. 10, 1959 H. HOLZWARTH ET AL 2,912,570
TRANSMITTER LINEARIZED BY NEGATIVE FEEDBACK
Filed June 26, 1957
Fig. 1
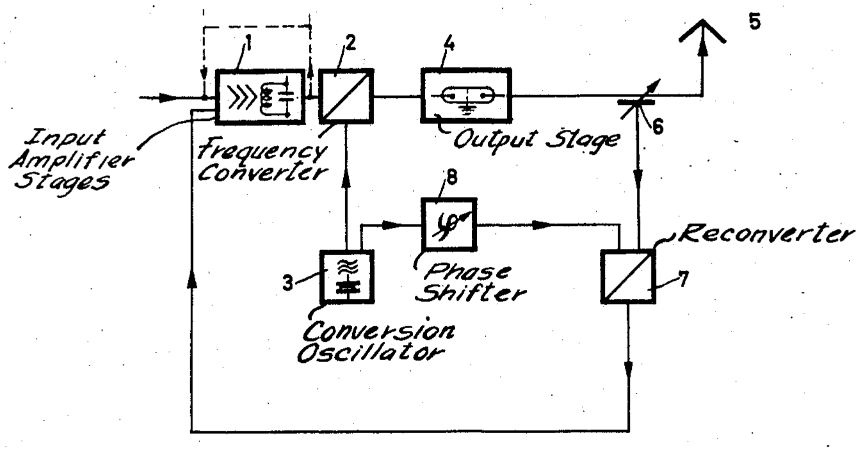
Fig. 2 Fig. 3
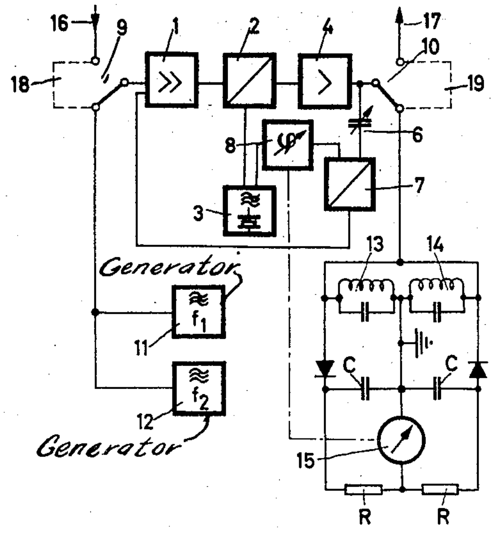
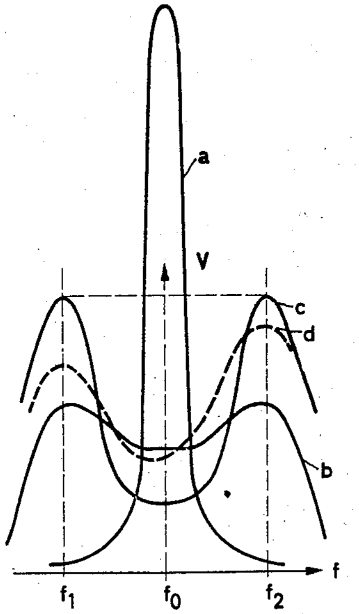
Inventors.
Herbert Holzwarth,
Dieter Leypold, &
Hans Leysieffer.
By [signature] Atty.

United States Patent Office 2,912,570
Patented Nov. 10, 1959

2,912,570

TRANSMITTER LINEARIZED BY NEGATIVE FEEDBACK

Herbert Holzwarth and Dieter Leypold, Munich, and Hans Leysieffer, Munich-Solln, Germany, assignors to Siemens and Halske Aktiengesellschaft, Berlin and Munich, Germany, a corporation of Germany Application June 26, 1957, Serial No. 668,252

Claims priority, application Germany July 19, 1956

6 Claims. (Cl. 250—17)

The present invention relates to a transmitter, particularly for very short, preferably amplitude modulated electromagnetic waves, which is linearized by a feedback circuit.

In transmitters of this type which are intended mostly for single-side band, multi-channel communication, particularly for ultrashort waves, the high frequency section is divided into stages with stagewise frequency conversion and a part of the energy is removed from the output of the final stage, converted back into the frequency position of a prior stage and fed back to the prior stage as feedback by way of a variable phase-shift member. The phase shifter which assures the precise feedback is inserted in the feed line from the reconverter to the prior stage. In actual practice it is found that it is difficult to provide in this manner effectively feedback over a large frequency range and thus sufficiently reduce the harmonic distortion of the transmitter.

The object of the present invention is, among others, to provide in this respect a substantial improvement in a transmitter linearized by means of a feedback circuit.

In accordance with the invention, this object is achieved by inserting a variable phase-shift into the feed line from the conversion oscillator to the converter proper at least in connection with one of the frequency converters. The two frequency converters are suitably fed from a common conversion oscillator with mutually balanced outputs.

The invention will be described with reference to the accompanying drawing, in which:

Fig. 1 shows a block diagram of a transmitter made in accordance with the invention;

Fig. 2 shows a circuit for placing the phase shifter, for example, incident to alteration of the frequency to be transmitted, automatically into correct position for phaseally accurate feedback; and Fig. 3 shows performance curves to explain the operation.

Referring now to the transmitter shown in Fig. 1, there is provided a multi-stage input stage amplifier 1, operating at the frequency of for instance 35 megacycles, to the input of which are fed the waves which have been modulated with a signal—in the case of a single band AM transmission, for instance, the side band which contains the modulation.

To the output of the input stages 1, there is connected a frequency converter 2, preferably developed as power mixer stage, which is fed by a conversion oscillator 3 provided with two mutually balanced outputs. The conversion oscillator 3 may for instance be a quartz-stabilized, multi-stage oscillator which in the embodiment given by way of example has a frequency on the order of magnitude of 300 megacycles. One of the mixed products formed in the frequency converter 2, for instance, the one of immediately higher frequency is fed to the output stage 4 proper, suitably to a tetrode or triode operated with grounded grid. For the sake of clarity, there is shown in the block 4 which indicates the final output stage, a triode connected in grid-base circuit, that is, with grounded grid.

It is advisable to select the output resistance of the frequency converter 2 as high as possible as compared with the input impedance of the output tube operated with grounded grid circuit and, furthermore, to actuate the output tube so that it is at least approximately free of grid current. This provides, in known manner, an additional feedback. The output stage 4 feeds the antenna 5 from the lead-in of which a part of the output energy of the output stage 4 is tapped off over an attenuating member 6, for instance, a capacitor of variable capacitance, and fed to a reconverter 7. This reconverter 7 is fed by the second output of the conversion oscillator 3 with the interposition of a known variable phase shifter 8. The variable phase shifter 8 may, for instance, comprise a line the electrical length of which is variable, or concentric elements such as two conductances lying in the longitudinal branches of a T-member and a capacitance lying in the transverse branch which are jointly variable. It is advisable to select the cut-off frequency of this high pass filter lower than the output frequency of the conversion oscillator to obtain a phase shift the attenuation of which is practically independent. From the reconverter 7, there is taken the mixed product of the low, that is, the input-stage frequency and fed to the input stage 1 by way of a second balanced input.

The arrangement considered as a whole operates similarly as the initially described known arrangement, but has among others the following substantial advantages.

While in the case of the previous embodiment of the feedback circuit, the phase shift member 8 had to have practically constant phase shift over a large frequency range—since it was located directly in the feedback path—this is not necessary in the case of the invention since it is only connected in the feed line for the conversion carrier serving for the conversion. The phase shift member therefore need have in its given adjustment a given phase shift only for a given frequency and not however for the entire frequency range in which there is to be operatively effective feedback. In addition to the known connection of the phase shift member directly in the feedback path (6, 7, 1), the phase shift member, due to its unavoidable damping, furthermore requires a reconverter 7 of higher power, while in the circuit in accordance with the invention, the phase shift member 8 lies in a line branch in which sufficient energy is present.

The phase shift member may be connected either into the feed line from the conversion oscillator 3 to the frequency converter 2 or into the feed line from the conversion oscillator 3 to the reconverter 7. The aforementioned advantages are obtained in either case. Connection into the feed line to the reconverter 7 however has the further advantage that when the frequency converter 2 is developed as power mixer stage, which is advisable also in the known arrangements—as the investigations on which the invention is based have shown—the conversion voltage to be fed to the power mixer stage is not unnecessarily weakened.

For the purpose of linearization, it is entirely sufficient if the power mixer stage which, as is known, has a not inconsiderable amount of harmonic distortion, is so dimensioned that its harmonic distortion lies at least still just below that of the output stage 4. There is then in view of the input stage amplification which can within certain limits be increased as desired, and the resultant possibility of increasing the feedback, the assurance that the entire harmonic distortion can be brought to the required value.

In the case of an arrangement in accordance with the invention, it was furthermore found that it is advisable to make the individual circuits of the various stages, with the exception of only one thereof, as broad in band width as is still just permissible by the required stage amplifications and to develop the excepted circuit so that it is as selective in frequency as possible. The frequency-selective circuit is suitably provided in the last stage of the input amplifier 1 directly ahead of the frequency converter 2, since in such case an input voltage for the frequency converter 2 which is at all times sufficiently large is assured in a simple manner in view of the fact that the voltage amplification of the last input stage is then high. This frequency-selective circuit in the final stage of the input amplifier 1 is shown in the corresponding block 1 in the form of a resonance circuit. The selectivity of the single circuit can be made sufficiently large by a suitable selection of its LC-ratio and/or by a feedback which is if desired separated from the train of the input or transmitter amplifier. This feedback is indicated in connection with the block 1 (Fig. 1) as a dotted line extending from the output to the input of the corresponding input stage.

The invention is applicable not only in the case of single side band transmission with amplitude modulation, but in all cases where it is desired to effect transmission with as little harmonic distortion as possible.

In Fig. 2 there is shown a circuit arrangement which serves to bring the phase shift member 8 automatically into the correct position for feedback in proper phase upon a change for instance of the frequency which is sent out or transmitted.

In the same way as in the case of the first embodiment shown by way of example in Fig. 1, the signal modulated with the intelligence is fed by way of the feed line 16 and the output signal is obtained by way of the line 17 from the output stage 4. The entire final amplifier, including the input-stage circuit and feedback circuit, is assumed to be disconnectable from the feed lines 16 and 17 by means of two switches 9, 10, while in the final circuit, that is, with automatic resetting of the phase shift member 8, the switches 9 and 10 are absent and instead of them there are provided the connections 18, 19 shown in dotted lines. The feedback circuit proper operates in the same way as that described in Fig. 1, and similar parts are accordingly indicated by similar reference numerals.

It shall first be assumed that only the precise negative feedback is to be measured. For this purpose, the switches 9 and 10 are placed in positions shown to connect to the input of the input stage 1 two generators 11, 12 which have their frequency adjusted symmetrically to the middle frequency of the input stages 1; the output of the final stage 4 being connected over the switch 10 to two filters 13 and 14 which are tuned to the corresponding frequencies and with which two rectifiers and two RC-combinations are connected in a difference-circuit. The difference voltage is obtained similarly as in a bridge and indicated by a measuring instrument, for instance, a null indicator. In the embodiment shown, the filters 13, 14 comprise individual circuits which are tuned to the two frequency-transposed input-stage carriers of the frequency $f_1$ and $f_2$. In this condition, the power obtained from the generators 11, 12 and the circuit for obtaining the resetting value (13, 14, 15) may be used directly for setting the feedback in proper phase.

As is well known, the exact feedback always exists only for one frequency while toward the upper and lower frequencies as a result of the increasing phase shift there, the feedback slowly passes into spurious feedback. While thus for instance an amplifier without feedback has, considered from the standpoint of frequency, a pass curve such as designated by $a$ in Fig. 3, there is obtained, depending on the degree of the feed back a curve such as designated by $b$ in Fig. 3, for weak feedback and the curve as designated by $c$ for strong feedback.

As may be noted in particular from curve $c$, the amplification maxima occurring there are very substantial in the region of spurious feedback. It is therefore necessary to select the damping in the feedback loop at least so large, for instance by proper adjustment of the variable capacitor 6, that no self-excitation will take place at these amplification maxima. If the feedback is not adjusted precisely with correct phase for the median frequency $f_0$, there is obtained a curve such as indicated above for example by curve $d$ in Fig. 3. The amplification at one spurious feedback frequency is greater than at the other and it is necessary to determine the damping in the feedback loop based upon the higher amplification. However, this narrows the range of the possible feedback and it is therefore endeavored, considered from the standpoint of amplification for the entire final-stage part, including the input stages, to obtain a symmetrical pass characteristic such as shown for instance by curve $c$ in Fig. 3. If the two frequencies $f_1$ and $f_2$ are made symmetrical to the median frequency $f_0$, for instance by selecting them exactly equal to the spurious-feedback frequencies, then in case of correct adjustment of the phase shift member 8, the indication of the null or rest position is obtained at the output 15 of the difference circuit 13, 14. On the other hand, if the phase shift member 8 is not correctly adjusted but for instance the feedback of correct phase takes place at a lower or higher frequency, then the circuit tuned for instance to the frequency $f_2$ will receive higher voltage than the circuit tuned to the frequency $f_1$ and the indicating instrument 15 will give an indication which is a measure of the deviation of the adjustment of the phase shift member 8 from the correct adjustment.

This circuit arrangement may be used advantageously also as automatic resetting device for the phase shift member 8 and also in connection with the known transmitters of the type initially described. For use as automatic resetting device, in connection with the embodiment shown in Fig. 2, the output of the final stage 4 is to be connected both with the load feedline 17 and with the input of the difference circuit 13, 14, for instance by bridging the switch with an auxiliary line 19 and placing it into an end position and in the same manner operating the changeover switch 9. It is thereupon merely necessary to feed from the electric magnitude occurring in the branch of the indicating instrument 15 in manner known a resetting device, for instance a resetting motor or an electric resetting circuit for the phase shift member 8, in such a manner that even in the case of only slight deviation a resetting of the phase shift member to precise feedback is effected.

In case of a high output frequency of the final stage 4, for instance in the region of ultrashort waves and even shorter waves, it is advisable to connect the input of the difference circuit 13, 14 not to the output of the final stage 4 but to the output of the reconverter 7 and to dimension it for its output frequencies in corresponding manner.

Changes may be made within the scope and spirit of the appended claims.

We claim:

1. Transmitter linearized by a feedback circuit, particularly for very short, amplitude modulated electromagnetic waves, comprising means forming at least one input stage operating at low frequency, means forming a final stage, a first frequency converter interposed between the input stage and the final stage, means for tapping off a small portion of the high frequency from the output of said final stage, a second frequency converter for reconverting said portion to the frequency of the input stage, a conversion oscillator, a first feed line extending from said conversion oscillator to said first frequency converter, a second feed line extending from said conversion oscillator to said second frequency converter, means for feeding said reconverted frequency from said second frequency converter as a feedback to the input stage, and a variable phase shift member connected in at least one of said feed lines.

2. Transmitter according to claim 1, comprising a single resonance circuit of high selectivity disposed in the loop formed by the transmitter amplifier and the feedback path for determining the selectivity, said circuit being arranged ahead of said first frequency converter.

3. Transmitter according to claim 2, comprising a separate positive feedback for increasing the selectivity of said single circuit.

4. Transmitter according to claim 1, wherein said final stage provides for a grounded grid circuit and is operated at least approximately without grid current, the output impedance of the stage feeding the final stage exceeding the input impedance of the output tube.

5. Transmitter according to claim 1, comprising a resetting circuit for automatically adjusting the phase shift member for a given operating frequency to provide for such operating frequency feedback of proper phase.

6. Transmitter according to claim 5, comprising two high frequency sources connected to the input of the input stage, the frequency of said sources being symmetrical to the given operating frequency, and two filters connected to the output of the final stage, said filters being tuned to corresponding frequencies, the resetting magnitude for the phase shift member being derived from said filters by means of a difference circuit.

References Cited in the file of this patent

UNITED STATES PATENTS

| | | |
|---|---|---|
| 2,048,080 | Potter | July 21, 1936 |
| 2,172,453 | Rose | Sept. 12, 1939 |
| 2,375,126 | Mathes | May 1, 1945 |

FOREIGN PATENTS

| | | |
|---|---|---|
| 927,159 | Germany | May 2, 1955 |